US012725460B2

(12) United States Patent
Shahul Hamid et al.

(10) Patent No.: US 12,725,460 B2
(45) Date of Patent: Sep. 1, 2026

(54) MANAGING TELEMATIC DATA TRANSMISSION USING A GLOBAL NAVIGATION SATELLITE SYSTEM

(71) Applicant: International Business Machines Corporation, Armonk, NY (US)

(72) Inventors: Ahamed Jalaldeen Shahul Hamid, Bangalore (IN); Santosh Rajashekar, Bangalore (IN); Selvi John, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 80 days.

(21) Appl. No.: 18/438,582

(22) Filed: Feb. 12, 2024

(65) Prior Publication Data

US 2025/0259484 A1 Aug. 14, 2025

(51) Int. Cl.
*G07C 5/00* (2006.01)
*H04L 9/40* (2022.01)
(Continued)

(52) U.S. Cl.
CPC .......... *G07C 5/008* (2013.01); *H04L 43/0811* (2013.01); *H04L 63/0442* (2013.01); *H04L 67/561* (2022.05); *H04L 67/565* (2022.05)

(58) Field of Classification Search
CPC .............................. G07C 5/008; H04L 67/565
See application file for complete search history.

(56) References Cited

U.S. PATENT DOCUMENTS 5,742,509 A * 4/1998 Goldberg .............. G01S 5/0027 342/450
6,898,432 B1 * 5/2005 Jiang ..................... H04W 4/029 455/552.1

(Continued)

FOREIGN PATENT DOCUMENTS

CN 206115254 U 4/2017
EP 2128841 A1 12/2019

OTHER PUBLICATIONS

Bernstein, Leandra, “Satellite Connectivity Providing a ‘Bridge’ to Fully Autonomous Vehicles”, Kratos Defense & Security Solutions, Inc., Mar. 7, 2023, 4 Pages.

(Continued)

*Primary Examiner* — Jess Whittington
(74) *Attorney, Agent, or Firm* — Eric W. Chesley

(57) ABSTRACT

In an approach to managing telematic data transmission using a global navigation satellite system, one or more computer processors monitor an internet connectivity of a computing device associated with a vehicle. One or more computer processors determine the internet connectivity has failed. One or more computer processors retrieve health data associated with the vehicle. One or more computer processors transform the health data to a format associated with a global navigation satellite system (GNSS). One or more computer processors generate a message in the format associated with the GNSS that includes the transformed health data. One or more computer processors generate a message in the format associated with the GNSS that includes the transformed health data. One or more computer processors transmit the message from the computing device associated with the vehicle to a satellite. One or more computer processors transmit the message from the satellite to a service provider.

20 Claims, 3 Drawing Sheets

(51) Int. Cl.

| | |
|---|---|
| ***H04L 43/0811*** | (2022.01) |
| ***H04L 67/561*** | (2022.01) |
| ***H04L 67/565*** | (2022.01) |

(56) References Cited

U.S. PATENT DOCUMENTS

| | | | | |
|---|---|---|---|---|
| 8,452,486 | B2 * | 5/2013 | Banet | B60R 25/102 701/32.7 |
| 8,700,255 | B2 * | 4/2014 | Joseph | G09B 19/16 342/147 |
| 8,959,036 | B2 | 2/2015 | Huat | |
| 9,786,009 | B2 | 10/2017 | Schumann, Jr. | |
| 2006/0189309 | A1 * | 8/2006 | Good | H04W 16/14 455/427 |
| 2010/0268597 | A1 * | 10/2010 | Bookstaff | G06Q 30/0251 707/769 |
| 2014/0379205 | A1 | 12/2014 | Muetzel | |
| 2016/0233949 | A1 * | 8/2016 | Tillet | H04W 4/10 |
| 2016/0234660 | A1 * | 8/2016 | Tillet | H04W 76/45 |
| 2017/0347235 | A1 * | 11/2017 | Jeong | H04L 67/34 |
| 2018/0103411 | A1 * | 4/2018 | Greene | H05B 47/1985 |
| 2022/0319694 | A1 * | 10/2022 | Peterson | G16H 40/67 |
| 2023/0164647 | A1 * | 5/2023 | Tao | H04W 36/083 370/331 |
| 2023/0204792 | A1 * | 6/2023 | Lawrence | H04B 1/70754 342/357.42 |
| 2023/0267774 | A1 * | 8/2023 | Riley | G07C 5/0841 701/31.4 |
| 2024/0015690 | A1 * | 1/2024 | Bridges | H04L 5/0048 |
| 2024/0056171 | A1 * | 2/2024 | Shariatmadari | H04B 7/18504 |
| 2024/0151858 | A1 * | 5/2024 | Raghupathy | G01S 5/02216 |
| 2025/0133444 | A1 * | 4/2025 | Esswie | H04B 7/18513 |
| 2025/0133473 | A1 * | 4/2025 | Esswie | H04B 7/18563 |
| 2025/0203477 | A1 * | 6/2025 | Esswie | H04W 36/26 |
| 2025/0203479 | A1 * | 6/2025 | Esswie | H04W 36/0033 |
| 2025/0232254 | A1 * | 7/2025 | Fasula | G06Q 10/087 |

OTHER PUBLICATIONS

Clements, Amy, "How are Satellites Bringing Low-Latency Internet to Autonomous Vehicles?", Zuken Americas, Accessed on Nov. 14, 2023, 6 Pages.

Digital Matter, "In-Vehicle Monitoring Systems (IVMS)", Digital Matter, Accessed on Nov. 14, 2023, 4 Pages.

Elshafee et al., "Integrating Social Network Services with Vehicle Tracking Technologies", (IJACSA) International Journal of Advanced Computer Science and Applications, vol. 4, No. 6, 2013, 9 Pages.

Phalake et al., "Vehicle Telematics System using GPRS", International Journal of Computer Applications in Technology, vol. 02(01), Jan. 2011, 4 Pages.

Xu et al., "The Vehicle Monitoring System Based on GPRS", International Telemetering Conference Proceedings, International Foundation for Telemetering, The University of Arizona University Libraries, Accessed Nov. 14, 2023, 5 Pages.

* cited by examiner

MANAGING TELEMATIC DATA TRANSMISSION USING A GLOBAL NAVIGATION SATELLITE SYSTEM

BACKGROUND OF THE INVENTION

The present invention relates generally to the field of data communication, and more particularly to managing telematic data transmission using a global navigation satellite system.

Global Navigation Satellite System (GNSS) refers to a constellation of satellites providing signals from space that transmit positioning and timing data to GNSS receivers. Satellite navigation allows satellite navigation devices to determine their location (longitude, latitude, and altitude/elevation) to high precision (within a few centimeters to meters) using time signals transmitted along a line of sight by radio from satellites. The system can be used for providing position, navigation, or for tracking the position of something fitted with a receiver (satellite tracking). The signals also allow the electronic receiver to calculate the current local time to a high precision, which allows time synchronization. Satellite navigation systems operate independently of any telephonic or internet reception. Unlike unidirectional communication of conventional global positioning service (GPS) technology, significant improvements in GNSS technology have added support for bidirectional communication between Satellites and GNSS Devices. Extensibility of message formats used in GNSS allows adding new message types and commands.

NMEA 0183 is a combined electrical and data specification for communication between marine electronics such as echo sounder, sonars, anemometer, gyrocompass, autopilot, GPS receivers, and many other types of instruments. It has been defined and is controlled by the National Marine Electronics Association (NMEA). The NMEA 0183 standard uses a simple ASCII, serial communications protocol that defines how data are transmitted in a "sentence" from one "talker" to multiple "listeners" at a time. Through the use of intermediate expanders, a talker can have a unidirectional conversation with a nearly unlimited number of listeners, and using multiplexers, multiple sensors can talk to a single computer port.

Telematics is an interdisciplinary field that encompasses telecommunications, vehicular technologies (road transport, road safety, etc.), electrical engineering (sensors, instrumentation, wireless communications, etc.), and computer science (multimedia, Internet, etc.). Telematics can refer to the convergence of telecommunications and information processing and may specifically refer to automation in automobiles or vessels, such as the invention of the emergency warning system for vehicles, global positioning systems (GPS) navigation, integrated hands-free cell phones, wireless safety communications, and automatic driving assistance systems.

SUMMARY

Embodiments of the present invention disclose a computer-implemented method, a computer program product, and a system for managing telematic data transmission using a global navigation satellite system. The computer-implemented method may include one or more computer processors monitoring an internet connectivity of a computing device associated with a vehicle. One or more computer processors determine the internet connectivity has failed. One or more computer processors retrieve health data associated with the vehicle. One or more computer processors transform the health data to a format associated with a global navigation satellite system. One or more computer processors generate a message in the format associated with the global navigation satellite system that includes the transformed health data. One or more computer processors generate a message in the format associated with the global navigation satellite system that includes the transformed health data. One or more computer processors transmit the message from the computing device associated with the vehicle to a satellite. One or more computer processors transmit the message from the satellite to a service provider.

DETAILED DESCRIPTION

In the contemporary landscape of monitoring and maintenance of vehicles and vessels, the need for a reliable, independent, and pervasive communication mechanism for transmitting real-time health data i.e., telematics, of vehicles and vessels has become paramount. Such a communication mechanism is also required to execute various remote commands, such as lock the doors or start the engine and get an acknowledgement from the vehicle. Traditional methods depend on reliable mobile data service-based internet connectivity and can fall short in scenarios where network availability is unpredictable or compromised due to factors like natural disasters or remote locations with no network coverage. Additionally, concerns about data security and the complexity of maintaining internet connectivity across diverse geographical regions further complicate the current approaches.

Though satellite internet can be used in such scenarios, various limitations make satellite phones and/or satellite broadband devices infeasible to transmit health data from vehicles and vessels to a central server. Limitations may include a high upfront cost of satellite phones and satellite broadband devices, a high recurring cost for a subscription to a satellite communication plan with internet connectivity, physical damage, malfunction, or theft of a satellite phone and/or satellite broadband device, the impact of weather, such as a heavy rain storm, on satellite internet communication, geo-specific regulations, security restrictions, and/or complex processes that can make buying or carrying satellite phones and satellite broadband devices difficult for vehicle and vessel owners in many countries, installation and maintenance of a satellite dish on vehicles and vessels may not be feasible, and satellite internet communication established through a nearby satellite dish may limit mobility of vehicle and vessel owners.

Embodiments of the present invention recognize that vehicle/vessel health data communication to a central server of a service provider can be provided when mobile data-based internet connectivity is lost by implementing a system that utilizes bi-directional GNSS communication capability for health data transmission. Embodiments of the present invention also recognize that using GNSS hardware for health data transmission avoids the cost and maintenance of satellite phones and/or broadband devices. Implementation of embodiments of the invention may take a variety of forms, and exemplary implementation details are discussed subsequently with reference to the Figures.

Figure 1:
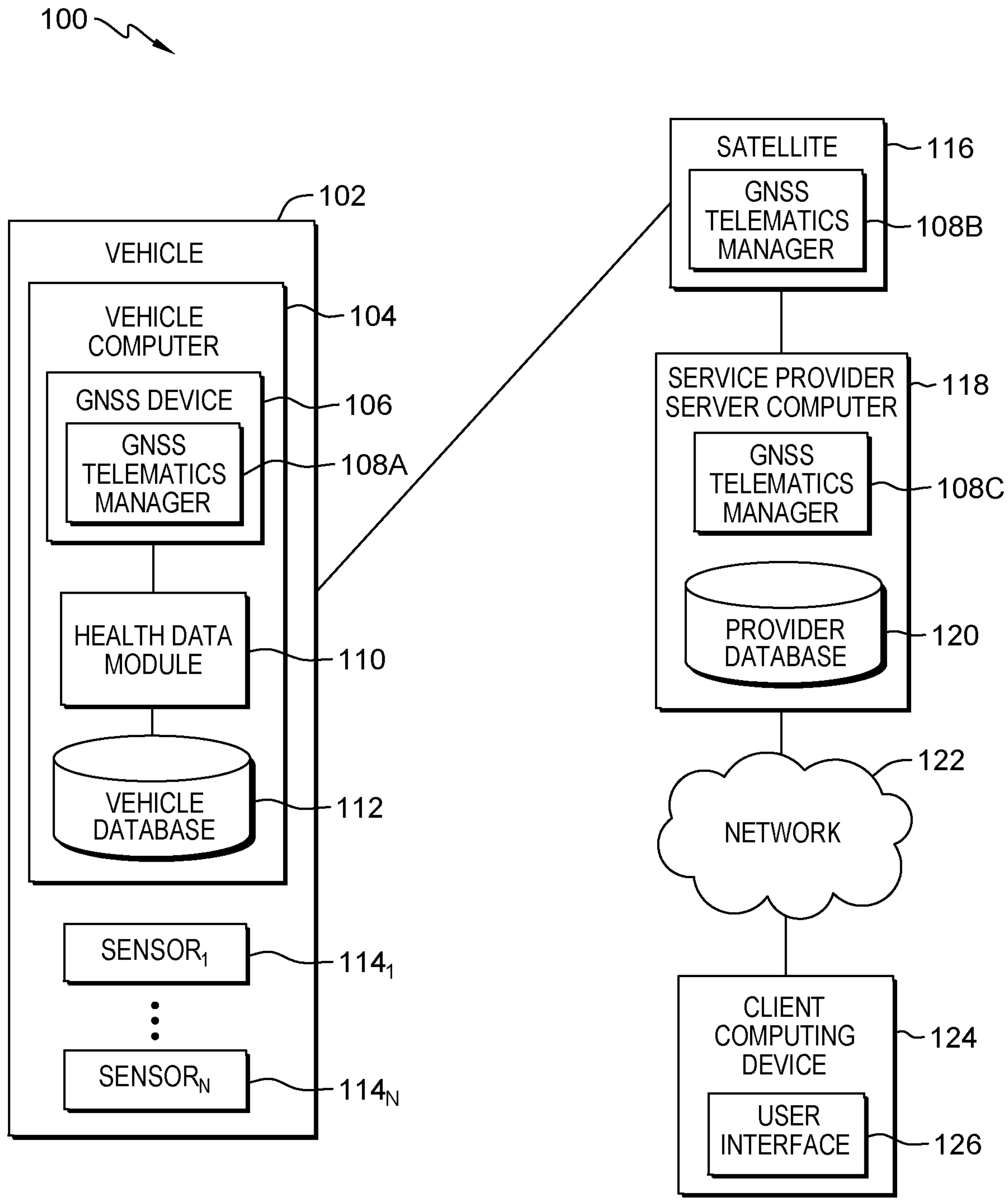
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes vehicle 102, satellite 116, service provider server computer 118, and client computing device 124. In the depicted environment, vehicle 102 and service provider server computer 118 are interconnected by satellite 116, while service provider server computer 118 and client computing device 124 are interconnected over network 122. Distributed data processing environment 100 may be implemented in computing environment 300 shown in FIG. 3.

Vehicle 102 is one of a plurality of vehicles and/or vessels for which health data is monitored via telematics. Although the present invention will be discussed with respect to a vehicle, embodiments of the present invention may also be implemented in other types of transportation, vessels, and cargo carriers, such as a car, a truck, a subway or freight train, a ferry boat, a container ship, a cruise ship, etc. Vehicle 102 includes vehicle computer 104 and sensor $\mathbf{114}_{1\text{-}N}$.

Vehicle computer 104 can be one or more of a laptop computer, a tablet computer, a smart phone, smart watch, a smart speaker, or any programmable electronic device capable of communicating with various components and devices within distributed data processing environment 100, via satellite 116. In an embodiment, vehicle computer 104 is integrated into vehicle 102. For example, vehicle computer 104 may include a heads-up display in the windshield of the vehicle. In an embodiment where vehicle computer 104 is integrated into vehicle 102, vehicle computer 104 includes a programmable, embedded Subscriber Identity Module (eSIM) card (not shown) that includes a unique identifier of the vehicle in addition to other vehicle information. In general, vehicle computer 104 represents one or more programmable electronic devices or combination of programmable electronic devices capable of executing machine readable program instructions and communicating with satellite 116 and other computing devices (not shown) within distributed data processing environment 100 via a GNSS device. Vehicle computer 104 includes GNSS device 106, health data module 110, and vehicle database 112. Vehicle computer 104 may include internal and external hardware components, as depicted and described in further detail with respect to computer 301 of FIG. 3.

GNSS device 106 is a speed and acceleration sensing device used as part of a global navigation service system. In an embodiment, GNSS device 106 is a receiver device that receives signals from satellite 116. In an embodiment, GNSS device 106 is integrated into vehicle 102. In another embodiment, GNSS device 106 is a standalone device that can be plugged in, or otherwise connected, to vehicle 102. GNSS device 106 enables transmission of health data from health data module 110 to satellite 116. Known capabilities of GNSS device 106 enable improved accuracy of geolocation data as data streams include precise timestamps and coordinates that conform to NMEA 0183 protocol. GNSS device 106 includes GNSS telematics manager 108A.

GNSS telematics manager 108 enables transmission of real-time health data of vehicles and/or vessels to a service provider when internet connectivity has failed or is lost, specifically mobile data and/or nearby vehicle-based internet connectivity. GNSS telematics manager 108 uses the bidirectional capability of a global navigation satellite system to send telematics from vehicles and/or vessels to a central server of the service provider regardless of the location of the vehicles and/or vessels, even in remote areas that have no internet connectivity and/or during severe weather conditions, such as a heavy rainstorm. GNSS telematics manager 108 enables vehicles and/or vessels to transmit health data during outages of internet connectivity caused by temporary disruptions, out of mobile network coverage area, natural disaster, or any major event that lasts for a significant period. GNSS telematics manager 108 monitors for internet connectivity, and if GNSS telematics manager 108 determines internet connectivity has failed, then GNSS telematics manager 108 retrieves health data associated with vehicle 102. GNSS telematics manager 108 transforms the health data to a GNSS format. GNSS telematics manager 108 encrypts the health data. GNSS telematics manager 108 generates a message with the encrypted health data and information associated with the service provider. GNSS telematics manager 108 transmits the message with the encrypted data from vehicle computer 104 to satellite 116. GNSS telematics manager 108 transmits the message with the encrypted data from satellite 116 to the service provider. Furthermore, notwithstanding depiction in distributed data processing environment 100, GNSS telematics manager 108 may be stored in and/or executed by, individually or in any combination, GNSS device 106, satellite 116, and service provider server computer 118 and is designated herein as GNSS telematics manager 108A, GNSS telematics manager 108B, and GNSS telematics manager 108C, respectively. GNSS telematics manager 108 is depicted and described in further detail with respect to FIG. 2.

Health data module 110 retrieves, collects, and/or aggregates data generated by sensor $\mathbf{114}\text{-}_N$ and transmits the data to GNSS telematics manager 108 and to vehicle database 112. Health data module 110 includes a configuration of a service provider associated with service provider server computer 118 such that GNSS telematics manager 108 can add the service provider information to a generated message.

In the depicted embodiment, vehicle database 112 resides on vehicle computer 104. In another embodiment, vehicle database 112 may reside elsewhere within distributed data processing environment 100, provided that GNSS telematics manager 108A and health data module 110 have access to vehicle database 112, via satellite 116. A database is an organized collection of data. Vehicle database 112 can be implemented with any type of storage device capable of storing data and configuration files that can be accessed and utilized by GNSS telematics manager 108A and health data module 110 such as a database server, a hard disk drive, or a flash memory. In an embodiment, vehicle database 112 stores data transmitted from sensor 114-$_N$. In another embodiment, vehicle database 112 stores data transmitted from health data module 110.

A sensor is a device that detects or measures a physical property and then records or otherwise responds to that property, such as vibration, chemicals, radio frequencies, environment, weather, humidity, light, etc. Sensor 114-$_N$, herein sensor(s) 114, detect a plurality of attributes of vehicle 102. As used herein, N represents a positive integer, and accordingly the number of scenarios implemented in a given embodiment of the present invention is not limited to those depicted in FIG. 1. Sensor(s) 114 may be one or more of a plurality of types of camera, including, but not limited to, pin-hole, stereo, omni-directional, non-central, infrared, video, digital, three dimensional, panoramic, filter-based, wide-field, narrow-field, telescopic, microscopic, etc. In some embodiments, sensor(s) 114 include any device capable of imaging a portion of the electromagnetic spectrum. Sensor(s) 114 may be one or more of a plurality of types of microphone for detecting speech and other audible sounds. Sensor(s) 114 may include the ability to detect various vehicle health data attributes. For example, sensor(s) 114 may detect an oil level, a fuel level, a tire pressure, a status of a lock, etc. In another example, sensor(s) 114 may detect the speed, direction, acceleration, and/or deceleration of vehicle 102. Sensor(s) 114 may be able to detect weather conditions, such as air temperature, relative humidity, presence and type of precipitation, wind speed, etc. Sensor(s) 114 may be GPS sensors. For example, sensor(s) 114 may use GPS to detect the location of vehicle 102. Sensor(s) 114 may include various types of pressure sensors and/or strain gauges to detect, for example, a passenger in a seat. Sensor (s) 114 may include the ability to detect motion of a door or hatch of vehicle 102, such as opening and closing. Sensor(s) 114 may include the ability to detect a number of boarding passengers and disembarking passengers, as well as cargo being loaded or unloaded. Sensor(s) 114 may include the ability to detect and/or quantify space occupied by a passenger or cargo. In one embodiment, sensor(s) 114 transmit data directly to vehicle database 112. In another embodiment, sensor(s) 114 transmit data directly to health data module 110.

Satellite 116 is one of a plurality of satellites used in a global navigation satellite system for providing position or navigation, or for tracking the position of something fitted with a receiver (satellite tracking). Satellite 116 includes GNSS telematics manager 108B.

Service provider server computer 118 represents a service provider ground station for a provider of a service that provides a remote monitoring solution that handles and acts upon vehicle health data, as well as commands and/or requests from a user. Service provider server computer 118 can be a standalone computing device, a management server, a web server, a mobile computing device, or any other electronic device or computing system capable of receiving, sending, and processing data. In other embodiments, service provider server computer 118 can represent a server computing system utilizing multiple computers as a server system, such as in a cloud computing environment. In another embodiment, service provider server computer 118 can be a laptop computer, a tablet computer, a netbook computer, a personal computer (PC), a desktop computer, a personal digital assistant (PDA), a smart phone, an edge device, a containerized workload, or any programmable electronic device capable of communicating with vehicle 102 via satellite 116, as well as communicating with client computing device 124, and other computing devices (not shown) within distributed data processing environment 100, via network 122. In another embodiment, service provider server computer 118 represents a computing system utilizing clustered computers and components (e.g., database server computers, application server computers, etc.) that act as a single pool of seamless resources when accessed within distributed data processing environment 100. Service provider server computer 118 includes GNSS telematic manager 108C and provider database 120. Service provider server computer 118 may include internal and external hardware components, as depicted and described in further detail with respect to computer 301 of FIG. 3.

In the depicted embodiment, provider database 120 resides on service provider server computer 118. In another embodiment, provider database 120 may reside elsewhere within distributed data processing environment 100, provided that GNSS telematics manager 108B has access to provider database 120, via satellite 116. A database is an organized collection of data. Provider database 120 can be implemented with any type of storage device capable of storing data and configuration files that can be accessed and utilized by GNSS telematics manager 108C such as a database server, a hard disk drive, or a flash memory. In an embodiment, provider database 120 stores vehicle health data transmitted by GNSS telematics manager 108B on satellite 116.

Network 122 can be, for example, a telecommunications network, a local area network (LAN), a wide area network (WAN), such as the Internet, or a combination of the three, and can include wired, wireless, or fiber optic connections. Network 122 can include one or more wired and/or wireless networks capable of receiving and transmitting data, voice, and/or video signals, including multimedia signals that include voice, data, and video information. In general, network 122 can be any combination of connections and protocols that will support communications between service provider server computer 118, client computing device 124, and other computing devices (not shown) within distributed data processing environment 100.

Client computing device 124 can be one or more of a laptop computer, a tablet computer, a smart phone, smart watch, a smart speaker, or any programmable electronic device capable of communicating with various components and devices within distributed data processing environment 100, via network 122. Client computing device 124 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, client computing device 124 may be integrated into a vehicle. For example, client computing device 124 may be a heads-up display in the windshield of the vehicle. In an embodiment where client computing device 124 is integrated into the vehicle, client computing device 124 includes a programmable, embedded Subscriber Identity Module (eSIM) card (not shown) that includes a unique identifier of the vehicle in addition to other vehicle information. In general, client computing device 124 represents one or more programmable electronic devices or combination of programmable electronic devices capable of executing machine readable program instructions and communicating with other computing devices (not shown) within distributed data processing environment 100 via a network, such as network 122. Client computing device 124 includes an instance of user interface 126.

User interface 126 provides an interface between a user of client computing device 124 and service provider server computer 118. In one embodiment, user interface 126 is mobile application software. Mobile application software, or an "app," is a computer program designed to run on smart phones, tablet computers and other mobile devices. In one embodiment, user interface 126 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In an embodiment, user interface 126 enables a user of client computing device 124 to interact with service provider server computer 118, i.e., make requests and receive responses regarding vehicle health data and/or vehicle commands that can be transmitted via GNSS telematics manager 108 to the vehicle.

Figure 2:
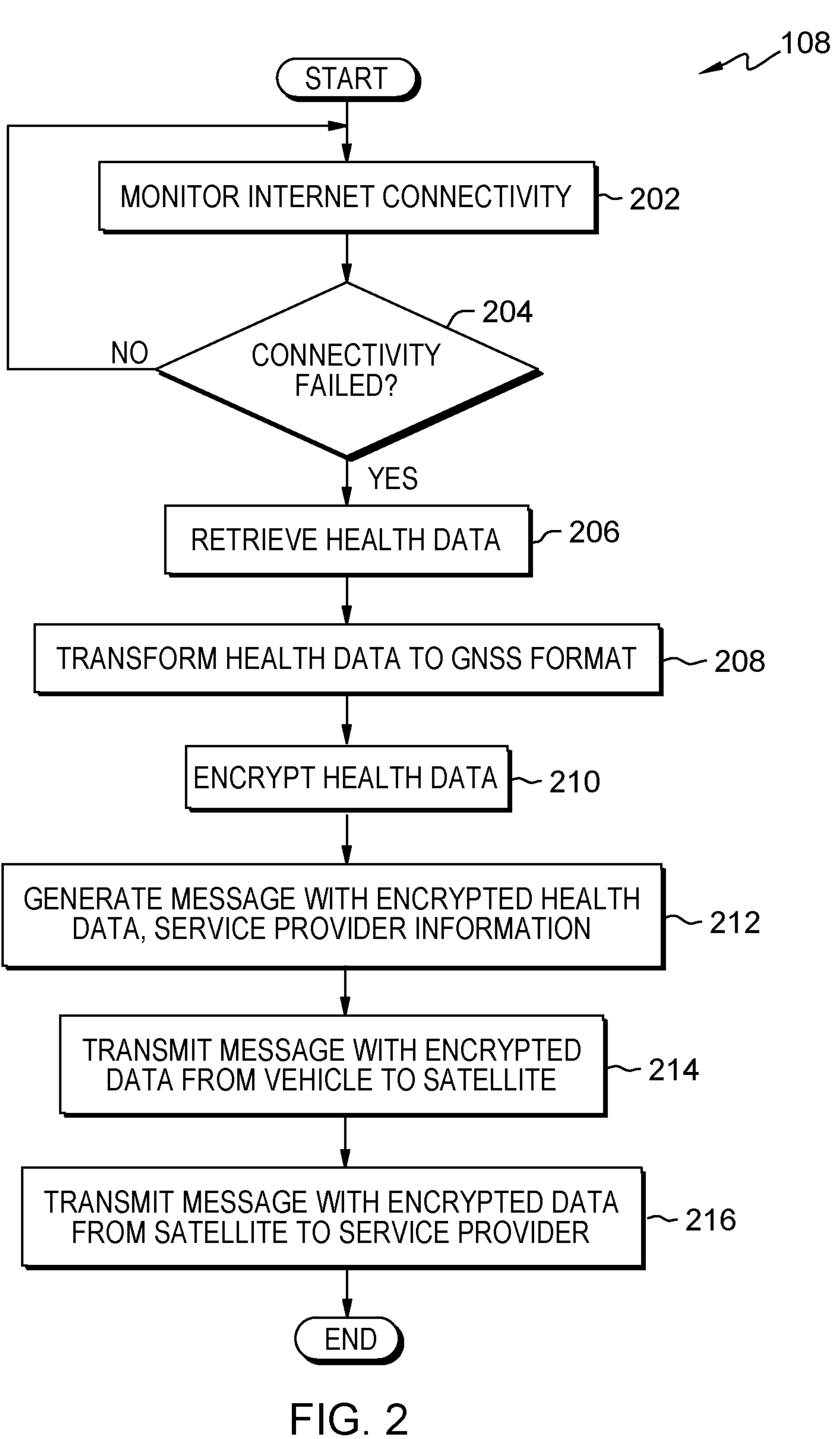
FIG. 2 is a flowchart depicting operational steps of a global navigation satellite system (GNSS) telematics manager, on a computer within the distributed data processing environment of FIG. 1, for managing telematic data transfer using a global navigation satellite system, in accordance with an embodiment of the present invention.

FIG. 2 is a flowchart depicting operational steps of GNSS telematics manager 108, on vehicle computer 104, satellite 116, and service provider server computer 118 within distributed data processing environment 100 of FIG. 1, for managing telematic data transmission using a global navigation satellite system, in accordance with an embodiment of the present invention.

GNSS telematics manager 108 monitors for internet connectivity (step 202). By default, vehicles and vessels, such as vehicle 102, use a mobile data-based internet connection to transmit health data to a central server of a health data monitoring service provider central server, such as service provider server computer 118. When the mobile data-based internet connection is impacted by low or no mobile signal or a temporary outage which can cause a transmission failure, then vehicles and vessels may attempt to use internet connectivity from a nearby vehicle or vessel to transmit the health data. In an embodiment, GNSS telematics manager 108 continuously monitors for internet connectivity between vehicle computer 104 and service provider server computer 118 to determine whether health data can be transmitted via the default process.

GNSS telematics manager 108 determines whether internet connectivity has failed (decision block 204). In an embodiment, based on the monitoring, GNSS telematics manager 108 determines whether a viable internet connection exists between vehicle computer 104 and service provider server computer 118, whether the connection is direct or via a nearby vehicle, or if that connection has failed or was lost. For example, GNSS telematics manager 108 may determine that vehicle 102 has moved to a location that is out of range of an internet connection. When both mobile data and nearby vehicle-based internet connectivity fails, GNSS telematics manager 108 intervenes to transmit real-time health data of the vehicle.

If GNSS telematics manager 108 determines internet connectivity has not failed ("no" branch, decision block 204), then GNSS telematics manager 108 returns to step 202 and continues to monitor for internet connectivity loss or failure.

If GNSS telematics manager 108 determines internet connectivity has failed ("yes" branch, decision block 204), then GNSS telematics manager 108 retrieves health data associated with a vehicle (step 206). In an embodiment, after sensor(s) 114 transmit health data detected in vehicle 102 to vehicle database 112, GNSS telematics manager 108 retrieves the health data from vehicle database 112. In another embodiment, after sensor(s) 114 transmit health data to health data module 110, GNSS telematics manager 108 retrieves the health data from health data module 110. In an embodiment, health data module 110 communicates with GNSS device 106 to make the health data available to GNSS telematics manager 108.

GNSS telematics manager 108 transforms the health data to a GNSS format (step 208). In an embodiment, GNSS telematics manager 108 transforms the telematic health data to structure the data into a GNSS message format, such as NMEA 0183 message format, as would be recognized by a person of skill in the art. For example, GNSS telematics manager 108 may use a data transformation map to transform the health data. In another example, GNSS telematics manager 108 may use a custom mapping component to transform the health data. In an embodiment, GNSS telematics manager 108 instructs health data module 110 to transform the data.

GNSS telematics manager 108 encrypts the health data (step 210). In an embodiment, in an effort to protect the privacy of vehicle owners while transmitting health data of the vehicle from GNSS device 106 to satellite 116 and, in turn, to service provider server computer 118, GNSS telematics manager 108 uses industry-standard encryption algorithms and best practices to encrypt the health data through software-based and/or hardware-based encryption processes at the network level, the message level, or a combination of both, thereby enforcing a stringent layer of security. For example, GNSS telematics manager 108 may use a hardware security module (HSM) to encrypt the data. In another example, GNSS telematics manager 108 may make use of a public key infrastructure of the service provider.

GNSS telematics manager 108 generates a message with the encrypted health data and information associated with the service provider (step 212). In an embodiment, GNSS telematics manager 108 generates a message in GNSS format that includes the encrypted health data and information associated with the service provider. In an embodiment, GNSS telematics manager 108 adds the service provider information to the header of the message. In an embodiment, GNSS telematics manager 108 adds new message types and/or commands and/or fields to the standard GNSS message format to accommodate the telematic data.

GNSS telematics manager 108 transmits the message with the encrypted data from vehicle computer 104 to satellite 116 (step 214). In an embodiment, GNSS telematics manager 108 makes use of the bidirectional GNSS communication link to transmit the generated message through a secure satellite communication link between GNSS device 106 and satellite 116. In an embodiment, GNSS telematics manager 108 transmits the message in binary or ASCII character encoding format to conform to NMEA 0183 formatting protocols. In an embodiment, GNSS telematics manager 108A transmits the message to GNSS telematics manager 108B.

GNSS telematics manager 108 transmits the message with the encrypted data from satellite 116 to the service provider (step 216). In an embodiment, GNSS telematics manager 108 receives the message with the encrypted data and decrypts and/or determines the service provider information in the message or message header in order to determine where to transmit the message. In an embodiment, GNSS telematics manager 108 transmits the encrypted health data to service provider server computer 118 through a secure communication link between satellite 116 and GNSS or other satellite link at the ground station of the service provider. By encrypting the health data and transmitting the health data directly from the satellite to the service provider, GNSS telematics manager 108 eliminates security risks such as "man-in-the-middle" and eavesdropping attacks that can happen in typical internet communications when the data travels through numerous hops between the vehicle and the service provider. In an embodiment, GNSS telematics manager 108B transmits the message to GNSS telematics manager 108C.

In an embodiment, GNSS telematics manager 108C receives the message that includes the encrypted health data and transforms the health data from GNSS message format, e.g., NMEA 0183, to a message format specific to the service provider. For example, GNSS telematics manager 108 may transform the data using a data transformation map, a custom mapping component, or other, similar approach. In the embodiment, the service provider decrypts the health data using a private key associated with the service provider to enable the service provider to perform necessary data validations on the health data. In an embodiment, the service provider stores the health data in provider database 120. In the embodiment, the service provider distributes the health data to one or more authorized entities, for example, a user of client computing device 124, an automobile insurance provider, a service station of an automobile manufacturer, a law enforcement agency, an emergency service, etc.

Figure 3:
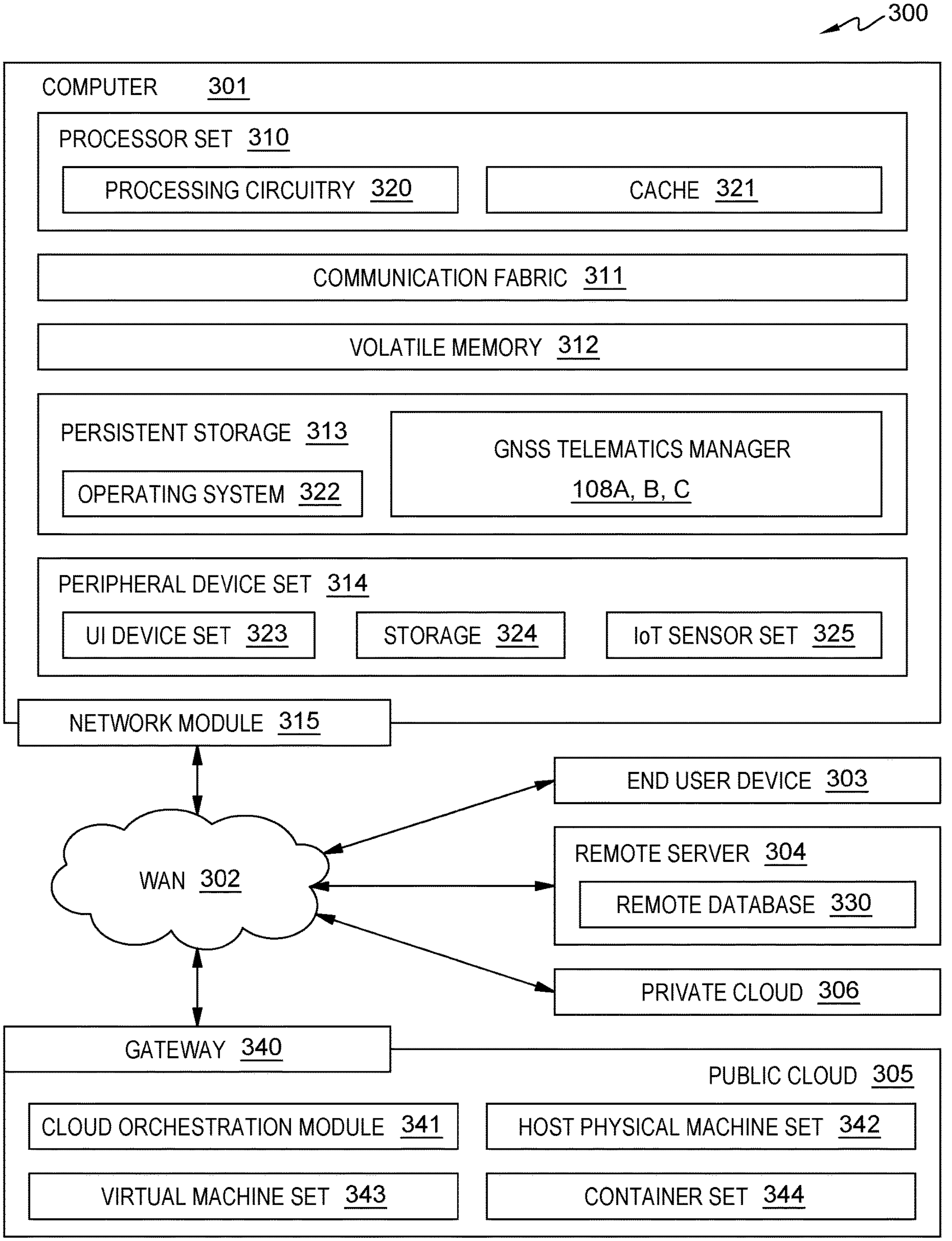
FIG. 3 illustrates an exemplary computer environment in which aspects of one or more of the illustrative embodiments may be implemented, and at least some of the computer code involved in performing the inventive methods may be executed, in accordance with an embodiment of the present invention.

FIG. 3 is an example diagram of a distributed data processing environment in which aspects of one or more of the illustrative embodiments may be implemented, and at least some of the computer code involved in performing the inventive methods may be executed, in accordance with an embodiment of the present invention, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing environment 300 contains an example of an environment for the execution of at least some of the computer code involved in performing the inventive methods, such as GNSS telematics manager 108 for managing telematic data transfer using a global navigation satellite system. In addition to GNSS telematics manager 108, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and GNSS telematics manager 108, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in GNSS telematics manager 108 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid-state storage devices. Operating system 322 may take several forms, such as various known proprietary operating systems or open-source Portable Operating System Interface type operating systems that employ a kernel. The code included in GNSS telematics manager 108 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

monitoring, by one or more computer processors, an internet connectivity of a computing device associated with a vehicle;

determining, by one or more computer processors, that the internet connectivity has failed;

retrieving, by one or more computer processors, health data associated with the vehicle;

transforming, by one or more computer processors, the health data into the National Marine Electronics Association (NMEA) standard message format that conforms to a bidirectional capability of a global navigation satellite system (GNSS), while preserving the semantic meaning of the health data;

generating, by one or more computer processors, a message in the NMEA standard message format that conforms to the bidirectional capability of the global navigation satellite system and includes the transformed health data;

transmitting, by one or more computer processors, the message from the computing device associated with the vehicle to a satellite in the global navigation satellite system; and transmitting, by one or more computer processors, the message from the satellite in the global navigation satellite system to a service provider.

2. The computer-implemented method of claim 1, further comprising:

determining, by one or more computer processors, information associated with the service provider; and adding, by one or more computer processors, the information to the message.

3. The computer-implemented method of claim 1, further comprising:

encrypting, by one or more computer processors, the transformed health data.

4. The computer-implemented method of claim 3, wherein encrypting the health data includes using a public key associated with the service provider.

5. The computer-implemented method of claim 1, wherein the computer associated with the vehicle includes a global navigation satellite system device for the (GNSS).

6. The computer-implemented method of claim 1, wherein the health data is generated by one or more telematic sensors.

7. The computer-implemented method of claim 1, wherein transforming the health data includes using at least one of a data transformation map and a custom mapping component.

8. A computer program product comprising:

one or more non-transitory computer readable storage media;

program instructions, stored on at least one of the one or more computer readable storage media, to monitor an internet connectivity of a computing device associated with a vehicle;

program instructions, stored on at least one of the one or more computer readable storage media, to determine the internet connectivity has failed;

program instructions, stored on at least one of the one or more computer readable storage media, to retrieve health data associated with the vehicle;

program instructions, stored on at least one of the one or more computer readable storage media, to transform the health data into the National Marine Electronics Association (NMEA) standard message format that conforms to a bidirectional capability of a global navigation satellite system (GNSS), while preserving the semantic meaning of the health data;

program instructions, stored on at least one of the one or more computer readable storage media, to generate a message in the NMEA standard message format that conforms to the bidirectional capability of the global navigation satellite system and includes the transformed health data;

program instructions, stored on at least one of the one or more computer readable storage media, to transmit the message from the computing device associated with the vehicle to a satellite in the global navigation satellite system; and program instructions, stored on at least one of the one or more computer readable storage media, to transmit the message from the satellite in the global navigation satellite system to a service provider.

9. The computer program product of claim 8, further comprising:

program instructions, stored on at least one of the one or more computer readable storage media, to determine information associated with the service provider; and program instructions, stored on at least one of the one or more computer readable storage media, to add the information to the message.

10. The computer program product of claim 8, further comprising:

program instructions, stored on at least one of the one or more computer readable storage media, to encrypt the transformed health data.

11. The computer program product of claim 10, wherein encrypting the health data includes using a public key associated with the service provider.

12. The computer program product of claim 8, wherein the computer associated with the vehicle includes a global navigation satellite system device.

13. The computer program product of claim 8, wherein the health data is generated by one or more telematic sensors.

14. The computer program product of claim 8, wherein transforming the health data includes using at least one of a data transformation map and a custom mapping component.

15. A computer system comprising:

one or more computer processors;

one or more computer readable memories; and one or more non-transitory computer readable storage media;

program instructions, stored on at least one of the one or more computer readable storage media for execution by at least one of the one or more computer processors via at least one of the one or more memories, to monitor an internet connectivity of a computing device associated with a vehicle;

program instructions, stored on at least one of the one or more computer readable storage media for execution by at least one of the one or more computer processors via at least one of the one or more memories, to determine the internet connectivity has failed;

program instructions, stored on at least one of the one or more computer readable storage media for execution by at least one of the one or more computer processors via at least one of the one or more memories, to retrieve health data associated with the vehicle;

program instructions, stored on at least one of the one or more computer readable storage media for execution by at least one of the one or more computer processors via at least one of the one or more memories, to transform the health data into the National Marine Electronics Association (NMEA) standard message format that conforms to bidirectional capability of a global navigation satellite system (GNSS), while preserving the semantic meaning of the health data;

program instructions, stored on at least one of the one or more computer readable storage media for execution by at least one of the one or more computer processors via at least one of the one or more memories, to generate a message in the NMEA standard message format that conforms to the bidirectional capability of the global navigation satellite system and includes the transformed health data;

program instructions, stored on at least one of the one or more computer readable storage media for execution by at least one of the one or more computer processors via at least one of the one or more memories, to transmit the message from the computing device associated with the vehicle to a satellite in the global navigation satellite system; and program instructions, stored on at least one of the one or more computer readable storage media for execution by at least one of the one or more computer processors via at least one of the one or more memories, to transmit the message from the satellite in the global navigation satellite system to a service provider.

16. The computer system of claim 15, further comprising:

program instructions, stored on at least one of the one or more computer readable storage media for execution by at least one of the one or more computer processors via at least one of the one or more memories, to determine information associated with the service provider; and program instructions, stored on at least one of the one or more computer readable storage media for execution by at least one of the one or more computer processors via at least one of the one or more memories, to add the information to the message.

17. The computer system of claim 15, further comprising:

program instructions, stored on at least one of the one or more computer readable storage media for execution by at least one of the one or more computer processors via at least one of the one or more memories, to encrypt the transformed health data.

18. The computer system of claim 17, wherein encrypting the health data includes using a public key associated with the service provider.

19. The computer system of claim 15, wherein the computer associated with the vehicle includes a global navigation satellite system device.

20. The computer system of claim 15, wherein transforming the health data includes using at least one of a data transformation map and a custom mapping component.

* * * * *